UNITED STATES PATENT OFFICE.

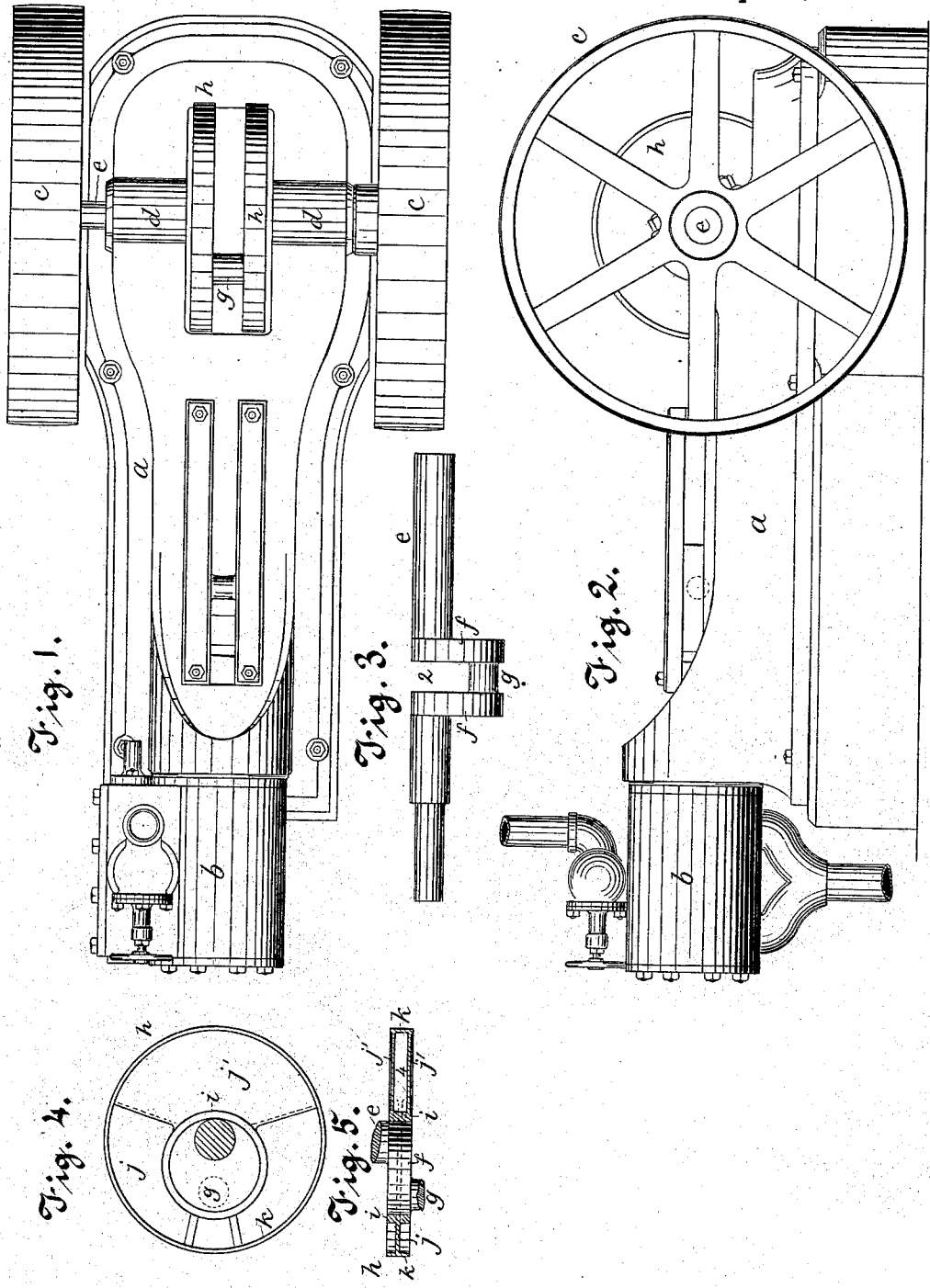

PARDON ARMINGTON, OF PROVIDENCE, RHODE ISLAND.

CRANKED AXLE FOR STEAM-ENGINES.

SPECIFICATION forming part of Letters Patent No. 263,832, dated September 5, 1882.

Application filed April 28, 1882. (No model.)

*To all whom it may concern:*

Be it known that I, PARDON ARMINGTON, of Providence, county of Providence, State of Rhode Island, have invented an Improvement in Steam-Engines, of which the following description, in connection with the accompanying drawings, is a specification.

My invention relates to steam-engines, and has for its object to perfectly balance the reciprocating parts, and thus render the engine lighter-running and relieve its bearings of undue strain.

The invention consists mainly in a novel construction of the cranked axle of the engine.

In engines as heretofore constructed, using a cranked axle, or an axle provided with a crank and crank-pin, the weight of the crank and reciprocating parts connected therewith has commonly been balanced by a weight applied to the proper portion of the fly-wheel; but as these two eccentric weights do not revolve in the same plane they produce strains upon the axle or fly-wheel shaft, causing it to bind in its bearings, and it is almost impossible to run an engine constructed in this way at a very high speed without heating and destroying the bearings.

Another method of making the crank which has heretofore been practiced consists in shrinking or keying a crank-plate upon each of the opposite ends of the main shaft, divided to receive the pitman between its portions, and connecting the said plates by a crank-pin, which is also wedged or keyed to the said plates; but in this construction it is difficult to maintain the plates and portions of the shaft in proper alignment, and the crank-pin is consequently not always in proper relation to its socket in the pitman or connecting-rod, the bearing-surfaces of which are thus also subjected to uneven wear and heating. When crank-plates of this kind are employed their weight is usually so distributed relative to the main shaft as to balance the reciprocating parts, and the said balancing-weight thus rotates in a plane sufficiently near to that of the reciprocating parts to be balanced to prevent the strains upon the shaft before referred to.

My invention consists in making a shaft with two parallel disks and the connecting-pin all in a single casting, preferably of steel, then turning the said shaft, pin, and disks to give them true surfaces, after which balancing-disks of a larger diameter are shrunk onto the said crank-pin disks, they being concentric with the main shaft and having their weight properly disposed to balance the momentum of the reciprocating parts when the engine is running at its normal speed. By this arrangement the crank-pin is rigidly connected with the main shaft, and the crank and balancing-plates run close to the connecting-rod on either side, so that the bearings for the main shaft can also be brought very close to the plane of action of the actuating forces, and the main shaft and its bearings are thus entirely relieved of strain.

Figure 1 is a plan view, and Fig. 2 a side elevation, of an engine provided with this invention; Fig. 3, a detail of the crank-shaft, and Figs. 4 and 5 a side elevation and section of the said crank-shaft provided with its balancing-disk.

The engine shown in Figs. 1 and 2, consisting of a bed-plate, *a*, provided with an engine-cylinder, *b*, and fly-wheels *c*, mounted on a shaft in bearings *d* in the said bed-plate, may be of any usual construction, these parts forming no part of my present invention. The main shaft *e*, supporting at its ends fly-wheels *c* of the said engine, is shown in Figs. 3, 4, and 5 as made in a casting having two parallel disks, *f*, eccentric to the said shaft, connected by a short cylinder or pin, *g*, near the periphery of the said disks remote from the said shaft, which is not continued across the spaces between the said disks, as shown at 2, Fig. 3. The casting thus made can be mounted in a lathe on the axis of the main portion *e* of the shaft, turned to give the said shaft the proper surfaces to rest in its bearings and to receive the hubs of the fly-wheels, and also to dress a portion of the plain surfaces of the disks, after which it may be mounted concentric to the said disks and their peripheries properly turned, and then mounted on the axis of the pin *g*, which will be properly turned, together with the adjacent portion of the plane surfaces of the disks *f*, to constitute a crank-pin for the said shaft. The said crank-pin *g* is thus rigidly connected with the shaft *e*, being formed in one continuous piece therewith, and there is consequently no possibility of the two portions of the shaft *e* getting out of alignment, or of the pin *g* getting out of alignment parallel with the said shaft.

In order to balance the weight of the disks $f$, pin $g$, and of connected pitman and reciprocating parts of the engine relative to the axis of the shaft $e$, the disks $f$ are provided with balancing-disks $h$, which, as shown in Figs. 4 and 5, consist of a hub, $i$, connected by a web, $j$, with a peripheral rim, $k$, of substantially the same width as the thickness of the disks $f$.

On the side opposite to the unbalanced weight of disks $f$ and parts connected therewith the disk $k$ is shown as having two web-pieces, $j'$, placed near its edges, and thus inclosing a space, 4, in the disk-chamber filled with lead or other suitable heavy material to properly balance the before-mentioned parts.

It will be seen, referring to Fig. 1, that the balancing-disks are very close to the pitman or connecting-rod, which is omitted in the drawings, and that the said disks are also very thin, so that the bearings $d$ are also brought close to the plane of action of the actuating force, and consequently the shaft and bearings are almost entirely relieved of strain. The balancing-disks $h$, being concentric with the shaft, have a pleasing appearance and conform readily to the frame-work of the machine.

I claim—

1. In an engine, the herein-described crank-shaft, consisting of a shaft, crank-disks, and crank-pin, all formed in a single piece, combined with independent balancing-disks mounted upon the said crank-disks, substantially as and for the purpose described.

2. The shaft, eccentric cylindrical disks, and connecting crank-pin, all made of a single piece of metal, combined with balancing-disks mounted upon the said eccentric disks and having their peripheries concentric with the main shaft, substantially as described.

3. The shaft, eccentric disks, and crank-pin, combined with the balancing-disks, consisting of hubs fitted upon the said eccentric disks, and peripheral webs connecting the said hubs with a peripheral rim concentric with the main shaft, constituting a chamber to receive heavy material for balancing the reciprocating parts, substantially as described.

In testimony whereof I have signed my name to this specification in the presence of two subscribing witnesses.

PARDON ARMINGTON.

Witnesses:
 FRED A. POWELL,
 BERNICE J. NOYES.